US007051215B2

(12) United States Patent
Zimmer et al.

(10) Patent No.: US 7,051,215 B2
(45) Date of Patent: May 23, 2006

(54) POWER MANAGEMENT FOR CLUSTERED COMPUTING PLATFORMS

(75) Inventors: Vincent J. Zimmer, Federal Way, WA (US); Michael A. Rothman, Gig Harbor, WA (US)

(73) Assignee: Intel Corporation, Santa Clara, CA (US)

( * ) Notice: Subject to any disclaimer, the term of this patent is extended or adjusted under 35 U.S.C. 154(b) by 345 days.

(21) Appl. No.: 10/461,038

(22) Filed: Jun. 13, 2003

(65) Prior Publication Data
US 2004/0255171 A1 Dec. 16, 2004

(51) Int. Cl.
*G06F 12/14* (2006.01)

(52) U.S. Cl. ............. 713/300; 713/320; 713/323; 713/324

(58) Field of Classification Search ............ 713/300, 713/320, 323, 324
See application file for complete search history.

(56) References Cited

U.S. PATENT DOCUMENTS

| 5,021,679 | A |  | 6/1991 | Fairbanks et al. |
| 5,153,535 | A |  | 10/1992 | Fairbanks et al. |
| 5,307,003 | A |  | 4/1994 | Fairbanks et al. |
| 5,627,412 | A |  | 5/1997 | Beard |
| 5,752,011 | A |  | 5/1998 | Thomas et al. |
| 5,974,557 | A |  | 10/1999 | Thomas et al. |
| 6,216,235 | B1 |  | 4/2001 | Thomas et al. |
| 6,487,668 | B1 |  | 11/2002 | Thomas et al. |
| 6,502,203 | B1 | * | 12/2002 | Barron et al. ............... 714/4 |
| 6,859,882 | B1 | * | 2/2005 | Fung ............................ 713/300 |
| 6,901,521 | B1 | * | 5/2005 | Chauvel et al. ............. 713/300 |
| 6,901,522 | B1 | * | 5/2005 | Buch ............................ 713/320 |
| 2003/0037150 | A1 | * | 2/2003 | Nakagawa ................... 709/229 |
| 2003/0037268 | A1 | * | 2/2003 | Kistler .......................... 713/310 |
| 2004/0003303 | A1 | * | 1/2004 | Oehler et al. ............... 713/300 |
| 2004/0107273 | A1 | * | 6/2004 | Biran et al. .................. 709/223 |
| 2004/0228087 | A1 | * | 11/2004 | Coglitore ..................... 361/687 |
| 2005/0108582 | A1 | * | 5/2005 | Fung ............................ 713/300 |

* cited by examiner

*Primary Examiner*—A. Elamin
(74) *Attorney, Agent, or Firm*—Blakely, Sokoloff, Taylor & Zafman LLP (57) ABSTRACT

Methods, apparatus, and systems for power management of clustered computing platforms. Firmware provided on each platform is loaded for operating system runtime availability. The firmware traps power change events corresponding to a change in a power state of a component or device associated with a platform, such as a processor or a peripheral device. In response to the power change event, the firmware sends corresponding data to a power arbiter using an out-of-band (OOB) communication network/channel. The power arbiter determines an appropriate reallocation of power consumption allotments for the various platforms under its control based on a power management policy. Updated power consumption allocation information is then sent to selected platforms via the OOB network/channel. Upon receipt of the updated allotments, corresponding registers and/or tables are updated on the platforms to effectuate a change in power consumption of one or more components/devices associated with the platform.

26 Claims, 6 Drawing Sheets

POWER MANAGEMENT FOR CLUSTERED COMPUTING PLATFORMS

FIELD OF THE INVENTION

The field of invention relates generally to clustered computing environments, and, more specifically but not exclusively relates to techniques for managing the power consumption of clustered computing platforms in a coordinated manner.

BACKGROUND INFORMATION

Information Technology (IT) managers and Chief Information Officers (CIOs) are under tremendous pressure to reduce capital and operating expenses without decreasing capacity. The pressure is driving IT management to provide computing resources that more efficiently utilize all infrastructure resources. To meet this objective, aspects of the following questions are often addressed: How to better manage server utilization; how to cope with smaller IT staff levels; how to better utilize floor space; and how to handle power issues.

Typically, a company's IT infrastructure is centered around computer servers that are linked together via various types of networks, such as private local area networks (LANs) and private and public wide area networks (WANs). The servers are used to deploy various applications and to manage data storage and transactional processes. Generally, these servers will include stand-alone servers and/or higher density rack-mounted servers, such as 2U and 1U servers.

Recently, a new server configuration has been introduced that provides unprecedented server density and economic scalability. This server configuration is known as a "blade server." A blade server employs a plurality of closely-spaced "server blades" (blades) disposed in a common chassis to deliver high-density computing functionality. Each blade provides a complete computing platform, including one or more processors, memory, network connection, and disk storage integrated on a single system board. Meanwhile, other components, such as power supplies and fans, are shared among the blades in a given chassis and/or rack. This provides a significant reduction in capital equipment costs when compared to conventional rack-mounted servers.

Generally, blade servers are targeted towards two markets: high density server environments under which individual blades handle independent tasks, such as web hosting; and scaled computer cluster environments. A scalable compute cluster (SCC) is a group of two or more computer systems, also known as compute nodes, configured to work together to perform computational-intensive tasks. By configuring multiple nodes to work together to perform a computational task, the task can be completed much more quickly than if a single system performed the tasks. In theory, the more nodes that are applied to a task, the quicker the task can be completed. In reality, the number of nodes that can effectively be used to complete the task is dependent on the application used.

A typical SCC is built using Intel®-based servers running the Linux operating system and cluster infrastructure software. These servers are often referred to as commodity off the shelf (COTS) servers. They are connected through a network to form the cluster. An SCC normally needs anywhere from tens to hundreds of servers to be effective at performing computational-intensive tasks. Fulfilling this need to group a large number of servers in one location to form a cluster is a perfect fit for a blade server. The blade server chassis design and architecture provides the ability to place a massive amount of computer horsepower in a single location. Furthermore, the built-in networking and switching capabilities of the blade server architecture enables individual blades to be added or removed, enabling optimal scaling for a given tasks. With such flexibility, blade server-based SCC's provides a cost-effective alternative to other infrastructure for performing computational tasks, such as supercomputers.

As discussed above, each blade in a blade server is enabled to provide full platform functionality, thus being able to operate independent of other blades in the server. Within this context, many blades employ modern power management schemes that are effectuated through built-in firmware and/or an operating system running on the blade platform. While this allows for generally effective power management on an individual blade basis, it doesn't consider the overall power management considerations applicable to the entire blade server. As a result, a blade server may need to be configured to handle a worst case power consumption condition, whereby the input power would need to meet or exceed a maximum continuous power rating for each blade times the maximum number of blades that could reside within the server chassis, the rack tower, of even in a room full of towers. Other power-management considerations concern power system component failures, such as a failed power supply or a failed cooling fan. Under current architectures, there is no scheme that enables efficient server-wide management of power consumption.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein like reference numerals refer to like parts throughout the various views unless otherwise specified:

FIG. 1b is a rear isometric view of the blade server chassis of FIG. 1a;

DETAILED DESCRIPTION OF PREFERRED EMBODIMENTS

Embodiments of methods and computer components and systems for performing power management in a distributed platform environment, such as a blade server environment, are described herein. In the following description, numerous specific details are set forth to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

In accordance with aspects of the invention, techniques are disclosed herein for managing power in blade server environments in a manner under which individual blades share a common power-management policy. The techniques employ firmware-based functionality that provides proactive, aggressive management of the platform power consumption without having the commensurate OS complexity. Further, the art is complementary to the Operating System Power Management (OSPM) standard, and is targeted to support the OSPM additions in future server operating system releases.

The policy is effectuated by several blades that share a common power source that needs to be optimized. Each blade employs a respective set of firmware that runs prior to the operating system load (pre-boot) and coincident with the operating system runtime. In one embodiment, runtime deployment is facilitated by a hidden execution mode known as the System Management Mode (SMM), which has the ability to receive and respond to periodic System Management Interrupts (SMI) to allow operating system power management control information to be transparently passed to firmware SMM code configured to effectuate the power management policy. The SMM power-management code conveys control and status messaging to other nodes via an out-of-band (OOB) network or communication channel, thus providing power status information to the shared resources, enabling a cluster/rack/or grid-wide power management policy to be implemented.

As an overview, typical blade server components and systems for which power management schemes in accordance with embodiments of the invention may be generally implemented are shown in FIGS. 1a–c and 2. Under a typical configuration, a rack-mounted chassis 100 is employed to provide power and communication functions for a plurality of blades 102, each of which occupies a corresponding slot. (It is noted that all slots in a chassis do not need to be occupied.) In turn, one of more chassis 100 may be installed in a blade server rack 103 shown in FIG. 1c. Each blade is coupled to an interface plane 104 (i.e., a backplane or mid-plane) upon installation via one or more mating connectors. Typically, the interface plane will include a plurality of respective mating connectors that provide power and communication signals to the blades. Under current practices, many interface planes provide "hot-swapping" functionality—that is, blades can be added or removed ("hot-swapped") on the fly, without taking the entire chassis down through appropriate power and data signal buffering.

Figure 1A:
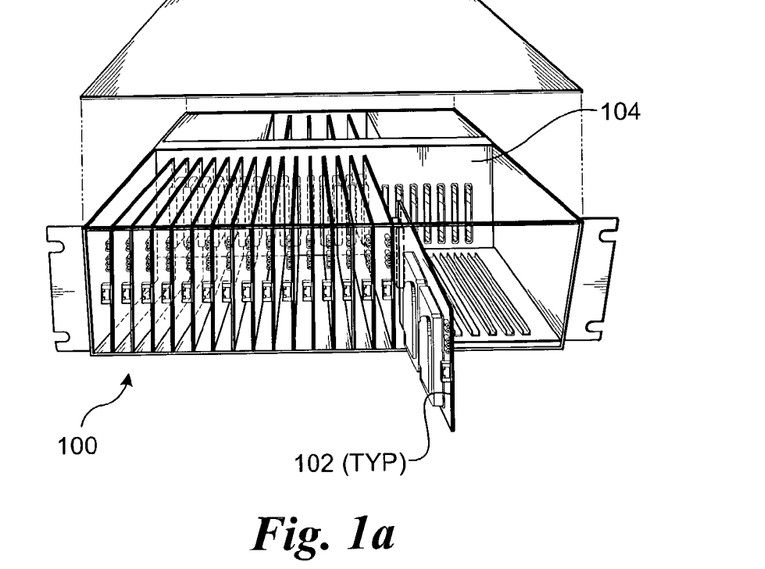
FIG. 1a is a frontal isometric view of an exemplary blade server chassis in which a plurality of server blades are installed.
Figure 1B:
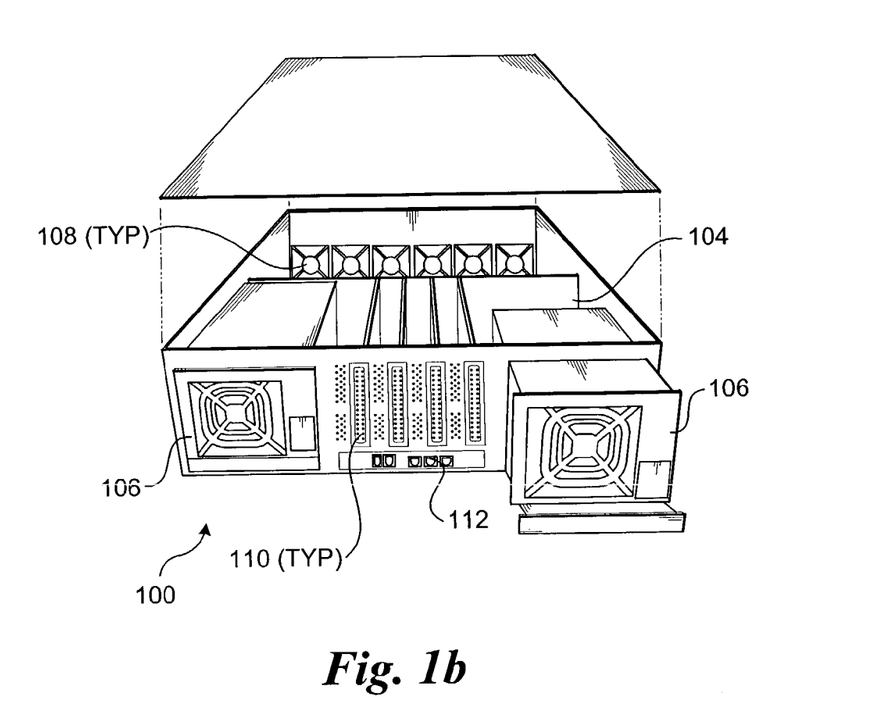
Figure 1C:
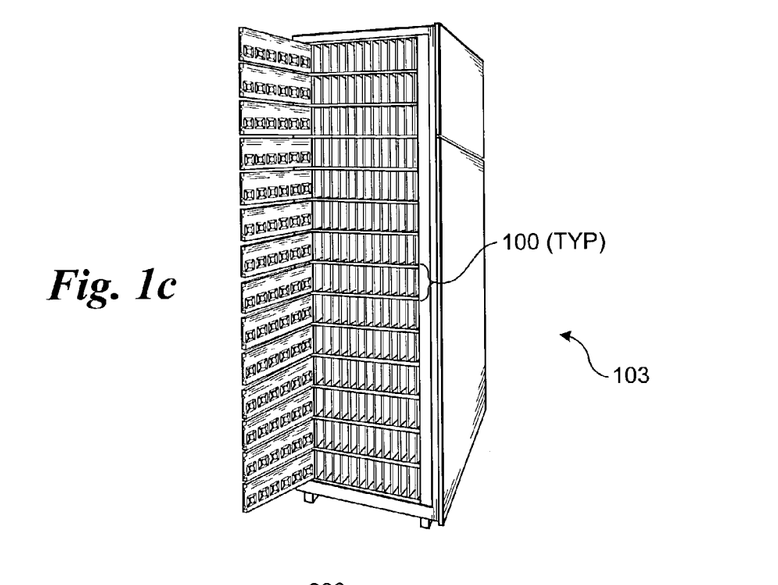
FIG. 1c is an isometric frontal view of an exemplary blade server rack in which a plurality of rack-mounted blade server chassis corresponding to FIGS. 1a and 1b are installed.

A typical mid-plane interface plane configuration is shown in FIGS. 1a and 1b. The backside of interface plane 104 is coupled to one or more power supplies 106. Oftentimes, the power supplies are redundant and hot-swappable, being coupled to appropriate power planes and conditioning circuitry to enable continued operation in the event of a power supply failure. In an optional configuration, an array of power supplies may be used to supply power to an entire rack of blades, wherein there is not a one-to-one power supply-to-chassis correspondence. A plurality of cooling fans 108 are employed to draw air through the chassis to cool the server blades.

An important feature required of all blade servers is the ability to communication externally with other IT infrastructure. This is typically facilitated via one or more network connect cards 110, each of which is coupled to interface plane 104. Generally, a network connect card may include a physical interface comprising a plurality of network port connections (e.g., RJ-45 ports), or may comprise a high-density connector designed to directly connect to a network device, such as a network switch, hub, or router.

Blades servers usually provide some type of management interface for managing operations of the individual blades. This may generally be facilitated by an out-of-band network or communication channel or channels. For example, one or more buses for facilitating a "private" or "management" network and appropriate switching may be built into the interface plane, or a private network may be implemented through closely-coupled network cabling and a network. Optionally, the switching and other management functionality may be provided by a management switch card 112 that is coupled to the backside or frontside of the interface plane. As yet another option, a management server may be employed to manage blade activities, wherein communications are handled via standard computer networking infrastructure, such as Ethernet.

Figure 2:
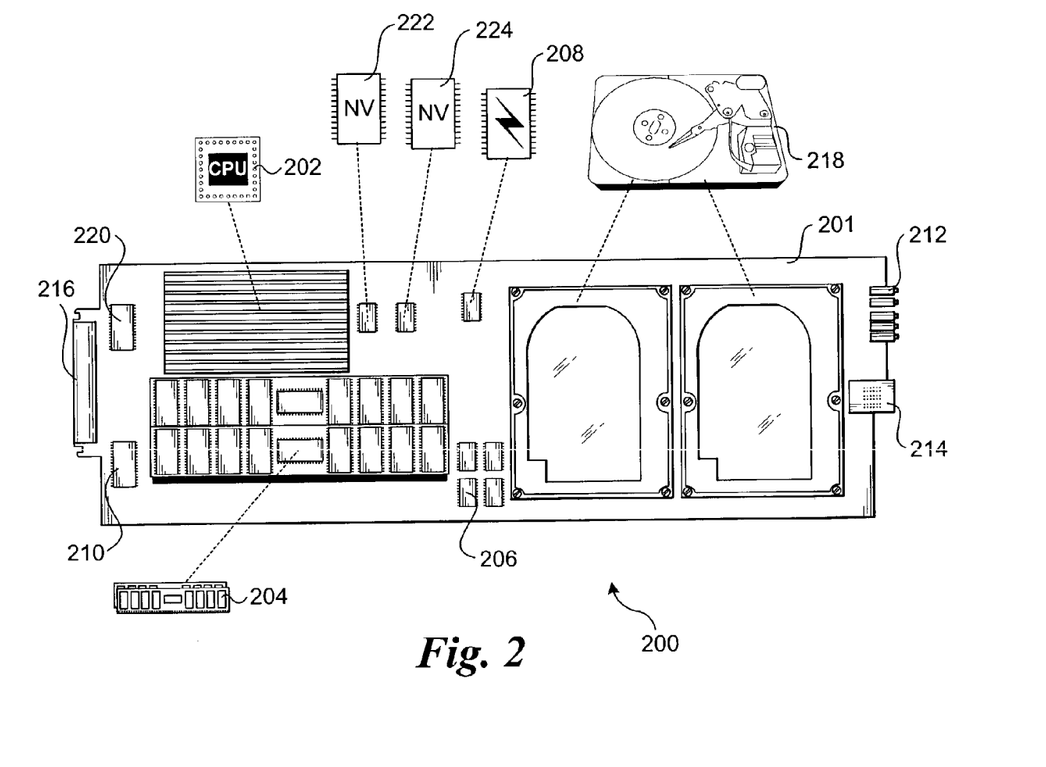
FIG. 2 shows details of the components of a typical server blade.

With reference to FIG. 2, further details of an exemplary blade 200 are shown. As discussed above, each blade comprises a separate computing platform that is configured to perform server-type functions, i.e., is a "server on a card." Accordingly, each blade includes components common to conventional servers, including a main circuit board 201 providing internal wiring (i.e., buses) for coupling appropriate integrated circuits (ICs) and other components mounted to the board. These components include one or more processors 202 coupled to system memory 204 (e.g., DDR RAM), cache memory 206 (e.g., SDRAM), and a firmware storage device 208 (e.g., flash memory). A "public" NIC (network interface) chip 210 is provided for supporting conventional network communication functions, such as to support communication between blades and external network infrastructure. Other illustrated components include status LEDs 212, an RJ-45 console port 214, and an interface plane connector 216. Additional components include various passive components (i.e., resistors, capacitors), power conditioning components, and peripheral device connectors.

Generally, each blade 200 will also provide on-board storage. This is typically facilitated via one or more built-in disk controllers and corresponding connectors to which one or more disk drives 218 are coupled. For example, typical disk controllers include Ultra ATA controllers, SCSI controllers, and the like. As an option, the disk drives may be housed separate from the blades in the same or a separate rack, such as might be the case when a network-attached storage (NAS) appliance is employed to storing large volumes of data.

In accordance with aspects of the invention, facilities are provided for out-of-band communication between blades, and optionally, dedicated management components. As used herein, and out-of-band communication channel comprises a communication means that supports communication between devices in an OS-transparent manner—that is, a means to enable inter-blade communication without requiring operating system complicity. Generally, various approaches may be employed to provide the OOB channel. These include but are not limited to using a dedicated bus, such as a system management bus that implements the SMBUS standard (www.smbus.org), a dedicated private or management network, such as an Ethernet-based network using VLAN-802.1Q), or a serial communication scheme, e.g., employing the RS-485 serial communication standard. One or more appropriate IC's for supporting such communication functions are also mounted to main board 201, as depicted by an OOB channel chip 220. At the same time, interface plane 104 will include corresponding buses or built-in network traces to support the selected OOB scheme. Optionally, in the case of a wired network scheme (e.g., Ethernet), appropriate network cabling and networking devices may be deployed inside or external to chassis 100.

As discussed above, embodiments of the invention employ a firmware-based scheme for effectuating a common power management policy across blade resources. In particular, power management firmware code is loaded during initialization of each blade and made available for access during OS run-time. However, rather than employ direct OS access to the power management functions, which would require modification to operating systems wishing to implement the power management techniques, appropriate power management functions are invoked indirectly in response to changes in the power states of the blades components. Under one scheme, such changes may be invoked on an individual blade (at least in part) by the operating system running on that blade. Under an optional deployment, power states on individual blades are exclusively controlled by the power management power.

In one embodiment, management of platform/component power states is enabled via a standardized power management scheme known the Advance Configuration and Power Interface ("ACPI"), defined in the ACPI Specification, Revision 2.0a, Mar. 31, 2002 developed in cooperation by Compaq Computer Corp., Intel Corp., Microsoft Corp., Phoenix Technologies Ltd., and Toshiba Corp. The ACPI Specification was developed to establish industry common interfaces enabling robust operating system directed motherboard device configuration and power management of both devices and entire systems. ACPI evolves an existing collection of power management BIOS code, Advance Power Management ("APM") application programming interfaces ("APIs"), and the like into a well-defined power management and configuration interface specification. ACPI provides a way for an orderly transition from existing legacy hardware to ACPI hardware, and allows for both ACPI and legacy mechanisms to simultaneously exist within a single processing system. The ACPI specification further describes a programming language, called ACPI Source Language ("ASL"), in which hardware designers can write device interfaces, called control methods. ASL is compiled into ACPI machine language ("AML") and the AML control methods placed in ACPI tables within system memory for use by the OS to interact with hardware devices.

Figure 3:
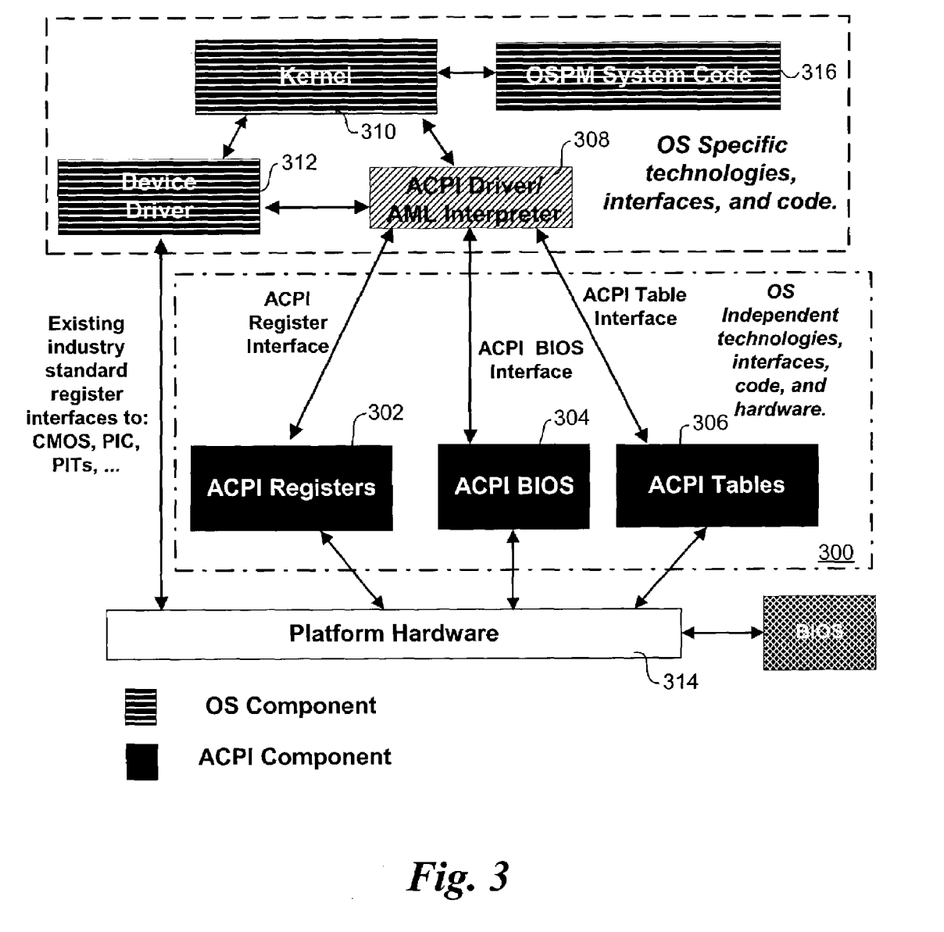
FIG. 3 is a schematic block diagram illustrating various firmware and operating system components used to deploy power management in accordance with the ACPI standard.

An overview of the ACPI architecture is shown in FIG. 3. At the core of ACPI is a set of OS-independent interfaces, code and data storage, depicted as ACPI core 300. Key core components include ACPI registers 302, ACPI BIOS 304, and ACPI Tables 306. An ACPI Driver/AML Interpreter 308 is enabled to interface with the core components via respective interfaces, including an ACPI register interface, an ACPI BIOS interface, and an ACPI table interface. The ACPI Driver/AML interpreter, in conjunction with these interfaces provides an abstracted interface to enable operating system components, including an OS kernel 310 and device drivers 312 to interface with the ACPI registers, BIOS, and tables. In turn, the ACPI registers, BIOS, and tables are employed to effectuate power management functions pertaining to the platform hardware 314.

Under operating system-controlled power management schemes (e.g., OSMP compliant schemes), software comprising OSPM System Code 316 for implementing a system's power management functions is written by the OS vendor to interact with other OS components, such as kernel 310 to control the power usage of various platform hardware. Generally, system devices that consume significant levels of power are targeted for power management, including the system's processor(s) and peripheral devices (e.g., hard disk(s), CD-ROM drive, floppy drives, and modems). Additional power management may be employed to control the operation of a system's cooling fans and/or power supply(ies), memory, I/O ports, and other components. As described in further detail below, under ACPI 2.0 power management can be extended to other devices/components as well.

In accordance with well-known ACPI principles, power usage for a given component or device is identified by a corresponding state. For an ACPI platform, a current state may comprise a global working state G0, with a number of possible processor power sub-states; a global sleep state, with a number of possible sleep sub-states; or one of several power off states. The various states for a desktop system are shown in Table 1 below:

TABLE 1

| State | Description/comments |
|---|---|
| G0/C0 | Processor working |
| G0/C1 | Auto-halt |
| G0/C2 | Stop-Grant/Quick start |
| G0/C3 | Not supported for the desktop |
| G1/S1 | Similar to G0/S2 state. CPUSLP# Signal can be used to shut circuits on the motherboard |
| G1/S2 | Not recommended for desktop |
| G1/S3 | Suspend to RAM state |
| G1/S4 | Suspend to Disk state |
| G2/S5 | Soft Off state |
| G3 | Mechanical Off state |

Power-managed peripheral devices implement lower power states similar to the system-level power management states. The device states are called D0, D1, D2, and D3. The difference between the D1, D2, and D3 states is that the lower power the state, the less power the device consumes.

ACPI uses tables (i.e., ACPI tables 306) to describe system information, features, and control methods, giving hardware vendors great implementation flexibility. The ACPI tables lists devices on the system board, or devices that cannot be detected or power managed using some other hardware standard, plus their capabilities. The tables describe system capabilities such as sleeping power states supported, the power planes and clock sources available in the system, batteries, system indicator lights, and other resources. That collection of information enables the operating system ACPI driver 308 to control system devices without needing to know how the system controls are actually implemented. The ACPI tables are loaded into system memory (e.g., the last two 64 KB segments from the top of memory) during system initialization.

In addition to the foregoing power state schemes, ACPI provides an alternative mechanism for controlling power usage. An object, known as _PPC (Performance Present Capabilities) provides a means to dynamically indicate to OSPM the number of performance states (P-states) currently supported by a platform. This object's method returns a number that indicates the _PSS entry number of the highest performance state that OSPM can use at a give time. OSPM may choose the corresponding state entry in the _PSS as indicated by the value returned by the _PPC method or any lower power (higher numbered) state entry in the _PSS.

For example, this mechanism can be used to control power consumption of a processor via processor throttling. Typically, a number of P states may be defined for a particular processor, wherein the lowest P state (P0) represents maximum clock rate operation (i.e., normal operation), while the highest P state (Pn) represents the lowest power consumption level. Respective P-states are then effectuated via corresponding throttling of the processor's clock.

In order to support dynamic changes of the _PPC object, ACPI 2.0 supports Notify events on the processor object. Notify events of type 0×80 will cause OSPM to reevaluate any _PPC objects residing under the particular processor object identified. This allows AML code to notify OSPM when the number of supported states may have changed as a result of an asynchronous event, such as AC insertion/removal, blade docking or undocking, etc.

Under principles of the invention, group-wise power management may be effectuated across multiple power consumers, including groups of blades, individual chassis, racks, or groups of racks. The group-wise power management employs a power management scheme that selectively adjusts the power consumption (i.e., power state settings) of individual blades and/or blade components. For example, in response to a sensed power change event (i.e., an event in which the power consumed by a given blade or bald/component changes, information is collected to determine the changed power consumption configuration, and a power management policy is applied to determine an updated power consumption configuration that should be applied to the group. Appropriate mechanisms are then employed to effect the updated power consumption configuration at the blade and/or blade component level.

In general, embodiments of the power management scheme may employ one of several strategies. In one embodiment, a central power manager (the power arbiter) is employed to manage power consumption of the group members. The power arbiter may typically comprise a dedicated blade management component (such as a management board or a remote management server), or may comprise a nominated blade from among the group. Under another embodiment, a peer-wise power management scheme is employed, wherein the blades collectively negotiate power state adjustments in response to a power change event. As yet another option, a combination of the two schemes may be employed, such as employer a central power manager to manage consumption at the chassis level, and employing a peer-wise scheme for managing power at the blade level for each chassis.

In accordance with one embodiment, the power management scheme is effectuated in a manner that is transparent to the operating system. This provides a significant advantage over OS-based power management strategies, since it doesn't require any changes to the OS code, nor does it require dedicated OS-runtime resources to manage power consumption. The scheme is implemented, at least in part, via firmware code stored on each blade. The firmware code is loaded into a protected or hidden memory space and invoked as an event handler in response to a sensed power change event.

Figure 4:
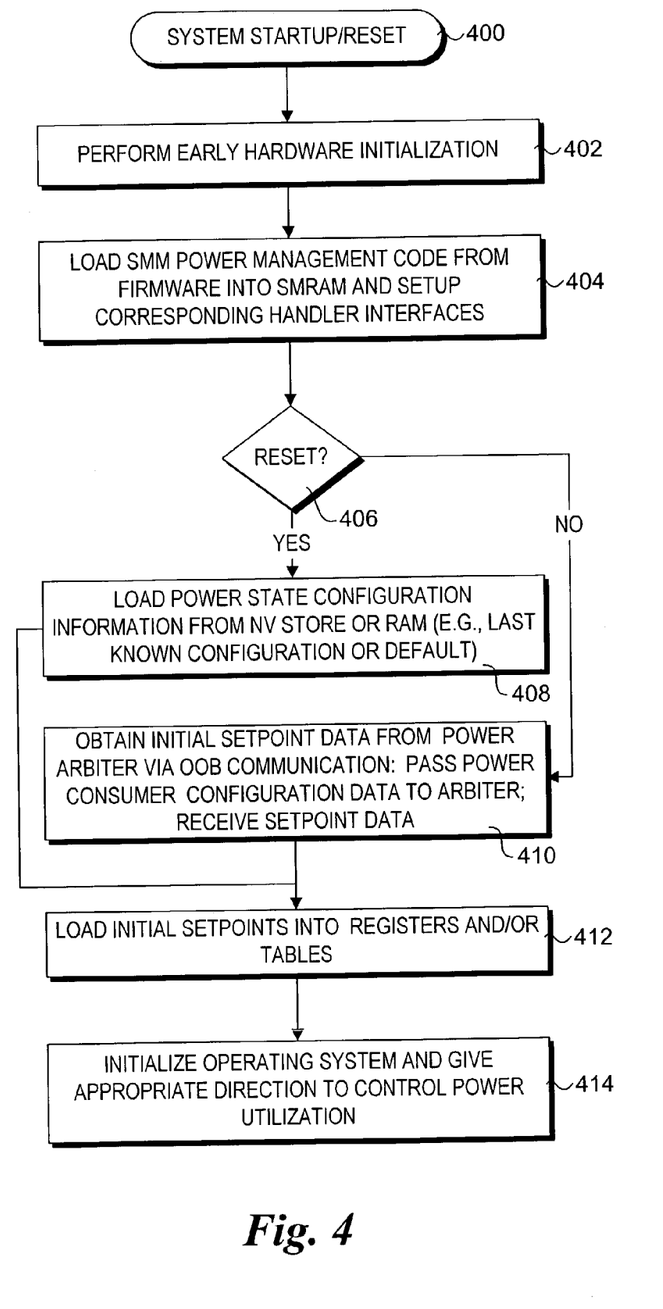
FIG. 4 is a flowchart illustrating operations and logic employed during blade initialization to configure a blade for implementing a power management scheme in accordance with one embodiment of the invention.

A flowchart illustrating operations and logic for initializing a blade to facilitate an OS-transparent power management scheme in accordance with one embodiment is shown in FIG. 4. The process begins with a system startup or reset event in a start block 400. For example, a system startup event would typically correspond to the insertion of a new blade into a chassis, or may result from a chassis power-on event. A reset, or warm boot might occur as a result of an explicit control input (e.g., manual activation of a reset switch or resetting via a management console), or may be implicitly generated by a management component.

In response to the restart or reset event, early hardware initialization is performed in a block 402. This typically includes performing hardware testing (e.g. POST), configuring memory, and loading firmware. Part of the hardware initialization includes setting up a portion of the system memory to be employed for system management purposes. This portion of memory is referred to as SMRAM, and is hidden from the subsequently loaded operating system.

In conjunction with the firmware load, SMM power management code stored in firmware is loaded into SMRAM, and SMM handlers for handling corresponding power management events and communications are setup. The handlers are a type of interrupt handler, and are invoked in response to a system management interrupt (SMI). In turn, an SMI interrupt may be asserted via an SMI pin on the system's processor. In response to an SMI interrupt, the processor stores its current context (i.e., information pertaining to current operations, including its current execution mode, stack and register information, etc.), and switches its execution mode to its system management mode. SMM handlers are then sequentially dispatched to determine if they are the appropriate handler for servicing the SMI event. This determination is made very early in the SMM handler code, such that there is little latency in determining which handler is appropriate. When this handler is identified, it is allowed to execute to completion to service the SMI event. After the SMI event is serviced, an RSM instruction is issued to return the processor to its previous execution mode using the previously saved context data. The net result is that SMM operation is completely transparent to the operating system.

Returning to the flowchart of FIG. 4, a determination is made in a decision block 406 to whether the event of start block 400 was a reset. If it was a reset, there has been no change in a chassis configuration (i.e., no new blades have been added). In one embodiment, power state configuration for the platform and various blade components and/or peripheral devices is stored in non-volatile memory or volatile system memory (RAM). Depending on the particular reset characteristics of the platform, a reset event may or may not clear out data that was in RAM prior to the event. In this instance, if power state configuration information is to persists through a reset, it must first be stored in a non-volatile store, such as a flash device. In one embodiment, a portion of the system's primary firmware storage device (e.g., a flash device) is reserved for storing this data. Typically, the power state data that are stored will either reflect a last known configuration or a default configuration. In accordance with the foregoing power state configuration data storage schemes, power state configuration data that are stored are retrieved from the storage device in a block 408.

If the event of start block 400 was a system startup, a previous operating condition did not exist. This also coincides with a change in the configuration of the chassis. As a result, the overall power management scheme for the managed group (e.g., set of blades, individual chassis, rack, or group of racks) may need to be adjusted. In one embodiment, any adjustments to power consumption allotments for individual blades and/or components are controlled by a power arbiter. Accordingly, the power arbiter may be employed to provide an initial set of power consumption allotments, which are facilitated by corresponding setpoints. In one embodiment, these setpoints correspond to P-states. Thus, in a block 410, an initial set of setpoint data is obtained from the power arbiter.

In one embodiment this operation begins by passing power consumer configuration data to the arbiter via the OOB communication channel/network, details of which are described in below. For example, the power consumer configuration data might identify various power consumers for the blade that may be controlled through corresponding setpoints, such as the platform, the processor, disk drive(s), memory, etc. Optionally, such data may be already stored by the power arbiter, wherein the data are retrieved from a table or the like in response to sensing that a corresponding blade has been added. Once the power consumer configuration data are received/retrieved, the power arbiter determines what setpoint allocations are to be made, and sends corresponding setpoint data back to the blade.

Once the operations of blocks 408 and 410 (whichever is applicable) are complete, the initial setpoints are loaded into appropriate registers and/or tables in a block 412. The operating system is then initialized in a block 414, and appropriate direction is given to the OS regarding how power consumption of the blade and its components/devices are to be controlled. For example, under OSPM, appropriate entries will be written to applicable ACPI tables. This completes the initialization process.

Figure 5:
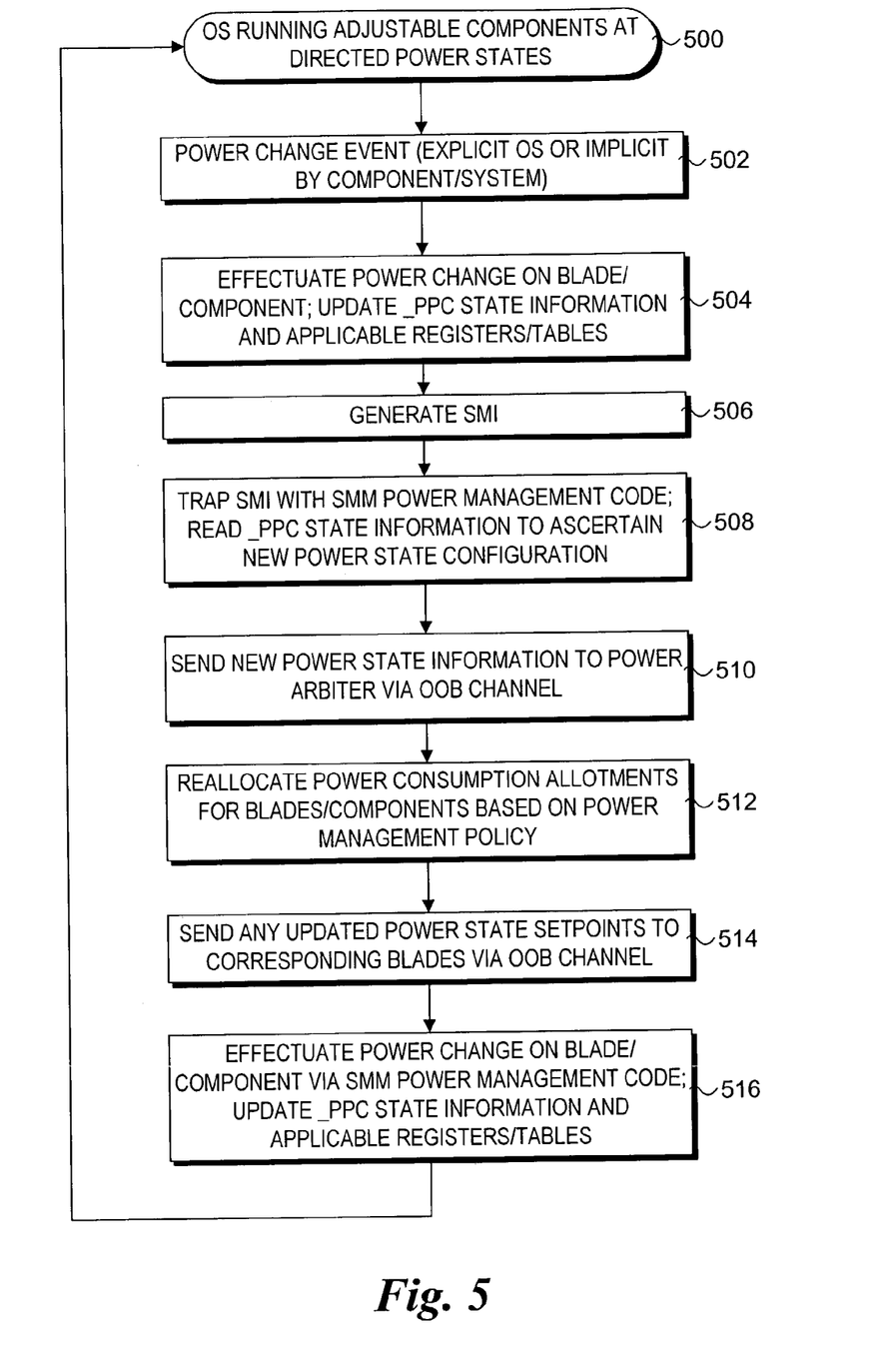
FIG. 5 is a flowchart illustrating operations and logic employed during operating system runtime in response to a power change event associated with a given blade in accordance with one embodiment of the invention.
Figure 6:
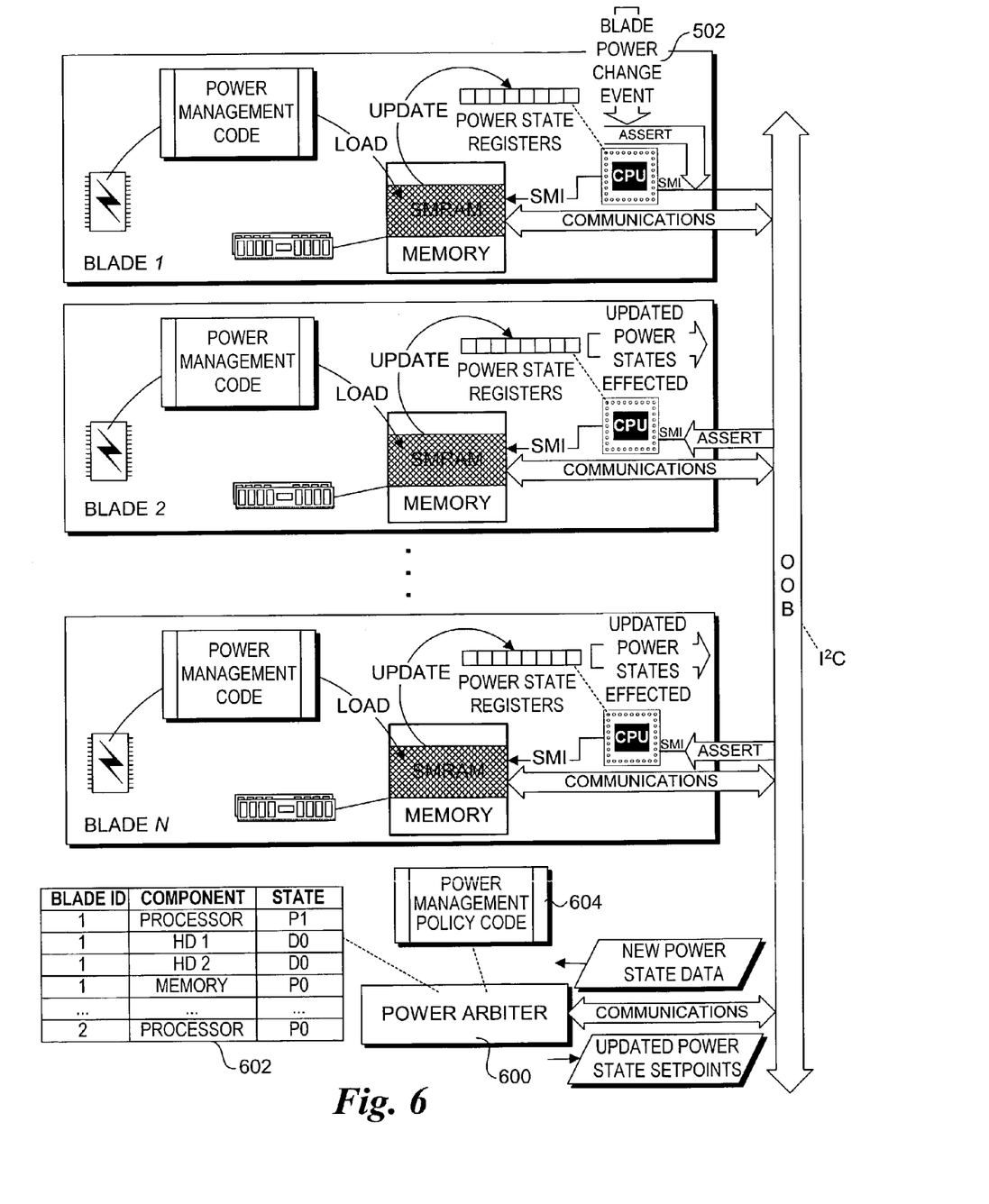
FIG. 6 is a schematic diagram for illustrating various data flows that occur during to the power change event operations illustrated in the flowchart of FIG. 5.

Ongoing operating system runtime power management operations and logic are depicted in the flowchart of FIG. 5, while corresponding data flows are graphically depicted in the schematic diagram of FIG. 6. This process begins in a start block 500 corresponding to a steady-state blade operation in which the OS is running its power-adjustable components at directed power states corresponding to its allocated setpoints. In a block 502, a power change event occurs. The power change event may generally result from an explicit OS command (e.g., put processor into a sleep state), or may result from an implicit hardware operation, such as a throttling of a processor invoked by built-in thermal management functions (e.g., as a result of a sensed over temperature condition).

Next, in a block 504, the power change on the blade (i.e., platform as a whole) or blade component (e.g., peripheral device, memory, etc.) is effectuated. If the power change event is invoked from operating system control (e.g., via OSPM), the change is may be effectuated through one of two mechanisms. In one instance, a change may be effectuated through an OS-level device driver (e.g., device driver 312 in FIG. 3) alone. In another case, the change is effectuated via ACPI driver/AML interpreter 308 and applicable ACPI firmware components. In either case, appropriate ACPI registers 302 and ACPI tables 306 are updated to reflect the power state configuration changes.

In response to the power change haven taken effect, it is desired to inform the power arbiter of the change to allow it to formulate new setpoints for other blades and components, if applicable. In one embodiment, this is facilitated by the aforementioned SMM hidden execution mode. Therefore, a SMI is generated in a block 506 to cause the processor to switch into SMM. This may be effectuated through one of two means—either an assertion of the processors SMI pin (i.e., a hardware-based generation), or via issuance of an "SMI" instruction (i.e., a software-based generation).

In a block 508 the SMI is trapped by the SMM power management code that was previously loaded into SMRAM during OS pre-boot. For example, respective SMM handlers may be provided for handling power changes to different blade components and devices, or a single SMM handler may be employed for handling all power-change events. Upon dispatch, the SMM handler reads the _PPC state information stored in ACPI table 306 to ascertain the new power state configuration.

Once ascertained, the new power state information is sent to the power arbiter via the OOB channel in a block 510. In one embodiment, a firmware driver will be employed to access the OOB channel. For instance, when the OOB channel is implemented via a network or serial means, an appropriate firmware driver will be provided to access the network or serial port. Since the configuration of the firmware driver will be known in advance (and thus independent of the operating system), the SMM handler may directly access the OOB channel via the firmware driver. Optionally, in the case of a dedicated management bus, such as I²C, direct access may be available to the SMM handler without a corresponding firmware driver, although this latter option could also be employed.

As discussed above, the power arbiter (depicted at 600 in FIG. 6) may be implemented via a dedicated management component, a remote management server, or may be implemented via one of the blades. Has used herein, the component, server or blade that facilitates the power arbiter tasks is termed the "power management entity." In the cases of a dedicated management component or remote management server, the power arbiter will usually be configured to listen for communications over the OOB. In contrast, when the power arbiter is implemented via one of the blades, a wake-up mechanism will generally be employed to let that blade know another resource desires to communicate with it. In one embodiment, this wake-up mechanism is implemented via a processor SMI pin. For example, when an SMBUS is deployed using I²C, one of the bus lines may be hardwired to the SMI pins of each blade's processor via that blade's connector. Optionally, the interface plane may provide a separate means for producing a similar result. Depending on the configuration, all SMI pins may be commonly tied to a single bus line, or the bus may be structured to enable independent SMI pin assertions for respective blades.

As yet another option, certain network interface chips (NIC), such as those made by Intel®, provide a second MAC address for use as a "back channel" in addition to a primary MAC address used for conventional network communications. Furthermore, these NICs provide a built-in system management feature, wherein an incoming communication referencing the second MAC address causes the NIC to assert an SMI signal. This scheme enables an OOB channel to be deployed over the same cabling as the "public" network (e.g., an external network).

In response to assertion of the SMI pin, the asserted processor switches to SMM execution mode and begins execution of its SMM handler(s) to facilitate the OOB communication. Thus, in each of the OOB communication network/channel options, the OOB communications are performed when the blade processors are operating in SMM, whereby the communications are transparent to the operating systems running on those blades.

In response to receiving the new power state configuration data, the power arbiter may selectively reallocate power consumption allotments for the blades and/or components based on its power management policy in a block 512. For example, under a chassis-wide power management policy, power consumption allotments may be reevaluated to determine a new optimal configuration that is predicated on some predefined power consumption limits and/or targets for a chassis. Similar policies may be enforced on groups of blades (within a single chassis or spanning multiple chassis), groups of chassis, individual racks, or groups of racks. In essence, the granularity of the power management policy may be tailored to the particular blade server environment. Generally, the policy may be based on a prorated power consumer allocation scheme, a pre-determined selective allocation scheme, or a dynamically determined selective allocation scheme.

In one embodiment, power arbiter 600 employs a set of tables 602 in conjunction with power management policy code 604 to effectuate the power management policy. Generally, tables 602 will contain data identifying current configuration power states, blade/component power consumption levels vs. power states, group-wise power limits/targets (e.g., nameplate power limits), and other data from which power consumption information may be derived.

Once any new setpoints are determined, they are sent to corresponding blades via the OOB channel in a block 514. The mechanism for facilitating this communication is similar to that described above with reference to employment of one of the blades as the power arbiter. Thus, an SMI is asserted for each of the affected blades (or all blades, depending on the SMI assertion scheme), causing the asserted processors to switch into their SMM execution mode and dispatch appropriate SMM handlers to facilitate transfer of the new setpoints to each blade.

An appropriate SMM handler then effectuates the power change(s) via the new setpoint(s) in a block 516. For components and devices that employ register values to define power states, appropriate registers are updated to reflect the new power states. At the same time, the _PPC state information is updated in the ACPI tables so that OS-controlled devices may update their respective power states. Again, this is done by the SMM handler in a manner that is transparent to the operating system, and thus does not require any OS knowledge. The next time the OS polls the _PPC state information, it recognizes the power state change(s) and effectuates corresponding changes on applicable components and devices.

In the foregoing schemes, it has been presumed that an operation system may have some means for effectuating power consumption changes. However, this is not meant to be limiting, as the principles of the invention may be employed to effect power management policies that do not involve any operating system complicity at all. For example, in one embodiment similar operations are employed to those discussed above, except there are no ACPI- or OSPM-associated operations. Such a scheme might typically be employed when the power consumers of concern include the processor and platform, while management of the power consumption of other blade components and devices is not performed.

Under an optional peer-management scheme, the power management policy is effectuated through negotiations between multiple blades, rather than via authority of a single power arbiter. In this case, the SMM power management code running on each blade includes peer-based power policy management code that is used to determine new power state setpoints for each blade itself, as well as code for negotiating setpoints from among a group of blades. For example, under a peer-managed group power level scheme, an administrator may set a level of power consumption that is reasonable for a set of blades (or systems) and the management policy would create some level of equilibrium between what each system's minimum and maximum power consumption settings should be. Since each machine has some level of autonomy and knows it's current power needs during it's particular workload, it can communicate through it's OOB channel if some deviation is going to occur from it's previously advertised power consumption to let other systems be aware of this situation and act accordingly.

Under yet another embodiment, the power management policy is implemented via a combination of a power arbiter and local management at each blade. In effect, the power arbiter determines a maximum or targeted power consumption level for a given blade, and the blade itself determines how to allocate its power allotment across its various components and devices.

As discussed above, the power arbiter may also be implemented via one of the blades. In one embodiment, this is accomplished through a nomination process, wherein each blade may include firmware for performing power arbiter operations. In general, the nomination scheme may be based on a physical assignment, such as a chassis slot, or may be based on an activation scheme, such as a first-in ordered scheme. For example, under a slot-based scheme, the blade having the lowest slot assignment for the group would be assigned power arbiter tasks. If that blade was removed, the blade having the lowest slot assignment from among the remaining blades would be nominated as the new power arbiter. Under a first-in ordered scheme, each blade would be assigned in installation order identifier (e.g., number) based on the order the blades were inserted or activated. The power arbiter task would be assigned to the blade with the lowest number, that is the first installed blade to begin with. Upon removal of that blade, the blade with the next lowest installation number would be nominated as the new power arbiter. In order to ensure current power state and configuration information persists across a change in the power arbiter, a redundancy scheme may be implemented wherein a second blade is nominated as a live back-up power arbiter.

It is noted that although the foregoing power management principles are discussed in the context of a blade server environment, this is not to be limiting. Each blade may be considered to be a separate platform, such as a rack-mounted server or a stand-alone server, wherein power management of a plurality of platforms could be effectuated via an OOB channel in the manner similar to that discussed above. For example, in a rack-mounted server configuration cabling and/or routing may be provided to support an OOB channel.

Also as discuss above, the power management policy is effectuated, at least in part, through firmware stored on each blade or platform. The firmware, which may typically comprise instructions and data for implementing the various operations described herein, will generally be stored on a non-volatile memory device, such as but not limited to a flash device, a ROM, or an EEPROM. The instructions are machine readable, either directly by a real machine (i.e., machine code) or via interpretation by a virtual machine (e.g., interpreted byte-code). Thus, embodiments of the invention may be used as or to support firmware executed upon some form of processing core (such as the CPU of a computer) or otherwise implemented or realized upon or within a machine-readable medium. A machine-readable medium includes any mechanism for storing or transmitting information in a form readable by a machine (e.g., a processor). For example, a machine-readable medium can include media such as a read only memory (ROM); a random access memory (RAM); a magnetic disk storage media; an optical storage media; and a flash memory device, etc. In addition, a machine-readable medium can include propagated signals such as electrical, optical, acoustical or other form of propagated signals (e.g., carrier waves, infrared signals, digital signals, etc.).

The above description of illustrated embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize.

These modifications can be made to the invention in light of the above detailed description. The terms used in the following claims should not be construed to limit the invention to the specific embodiments disclosed in the specification and the claims. Rather, the scope of the invention is to be determined entirely by the following claims, which are to be construed in accordance with established doctrines of claim interpretation.

What is claimed is:

1. A method for managing power consumption across a plurality of computing platforms, comprising:
    monitoring power change events corresponding in a change in a power state of a component or device associated with a given platform;
    reallocating a power consumption allotment for at least one computing platform in response to the power change event in accordance with a power management policy; and
    effectuating the reallocated power consumption allotment on said at least one computing platform in a manner that is transparent to an operating system running on said at least one computing platform.

2. The method of claim 1, wherein the plurality of computing platforms comprise a group of server blades operating in a blade server environment.

3. The method of claim 2, wherein the power change event corresponds to one of insertion of a new blade into a blade server chassis or removal of an existing blade from a blade server chassis.

4. The method of claim 2, wherein the power management policy is implemented across one of a group of server blades, an individual blade server chassis, a plurality of blade server chassis, a blade server rack, or a plurality of blade server racks.

5. The method of claim 1, wherein the method is performed in a manner that is transparent to operating systems running on the computing platforms.

6. The method of claim 1, wherein the method is facilitated by firmware running on each of the plurality of computing platforms, each computing platform including a processor on which an operating system is run, the firmware for that computing platform being executed in a hidden execution mode of the processor.

7. The method of claim 1, wherein the operations of monitoring power change events and reallocating power consumption allotments include:
    detecting a power change event corresponding to a first computing platform;
    determining power state configuration information pertaining to the power change event
    passing the power state configuration information to a power management entity that is external to the first computing platform; and
    determining the reallocation of the power consumption allotments at the power management entity.

8. The method of claim 7, wherein the power management entity comprises one of a dedicated management component or remote server coupled in communication to each of the plurality of computing platforms.

9. The method of claim 7, wherein the power management entity comprises a second computing platform.

10. The method of claim 1, wherein the operation of effectuating the reallocated power consumption allotment comprises:
    sending updated power consumption indicia to said at least one computing platform;
    updating at least one of a register and configuration table on each of said at least one computing platform in response to the updated power consumption indicia to cause a change in a power state of at least one component or device on that computing platform.

11. The method of claim 10, wherein the power consumption indicia comprises a performance state (P-state) identifying a corresponding power consumption state of said at least one component or device.

12. The method of claim 1, wherein the power change event results from a change in a power state of a component or device associated with a computing platform that is invoked by an operating system running on that computing platform.

13. The method of claim 1, wherein power change event results from a change in a power state of a component or device associated with a computing platform that is invoked internally by computing platform hardware.

14. The method of claim 1, wherein the power change event results from a change in a power state of a peripheral device.

15. The method of claim 1, wherein the power management policy is implemented as a peer-based policy under which power consumption allotments are negotiated among multiple computing platforms based on input from those computing platforms.

16. The method of claim 1, wherein the method is facilitated by passing data among the plurality of computing platforms using an out-of-band communication network or channel that operates transparently from operating systems running on the computing platforms.

17. A method for managing power consumption across a plurality of server blades, comprising:
    monitoring power change events corresponding in a change in a power state of a component or device associated with a first server blade;
    sending power state data indicative of the power change event via a first out-of-band (OOB) communication from the server blade to a power management entity;
    reallocating power consumption allotments for selected server blades from among the plurality of server blades in response to the power change event in accordance with a power management policy; and sending updated power consumption allotments to the selected server blades via a second OOB communication, wherein the first and second OOB communications are effectuated via firmware executed on a respective processor for each of the plurality of server blades, the processor for a given server blade hosting an operating system to which the OOB communications are transparent.

18. The method of claim 17, wherein the power management policy is implemented as a peer-based policy under which power consumption allotments are negotiated among the plurality of server blades based on input from the plurality of server blades.

19. An article of manufacture comprising a machine-readable medium having instructions stored thereon, which when executed on a computing platform causes the computing platform to perform operations including:

monitor power change events corresponding in a change in a power state of a component or device associated with the computing platform;

send power state data indicative of the power change event to a power management entity;

receive updated power consumption allotment data from the power management entity; and effectuate a change in a power consumption allotment of at least one component or device associated with the computing platform in response to the updated power consumption allotment data, wherein the operations of monitoring power change events, sending power state data, and receiving undated power consumption allotment data are performed in a manner that is transparent to an operating system running on the computing platform.

20. The article of manufacture of claim 19, wherein the instructions comprise firmware instructions.

21. The article of manufacture of claim 19, wherein the computing platform comprises a server blade.

22. A blade server system, comprising:

a chassis, including a plurality of slots in which respective server blades may be inserted;

an interface plane having a plurality of connectors for mating with respective connectors on inserted server blades and providing communication paths between the plurality of connectors to facilitate in out of band (OOB) communication channel; and a plurality of server blades, each including a processor and firmware executable thereon to cause that server blade to perform operations including:

monitor power change events corresponding in a change in a power state of a component or device associated with the server blade;

send power state data indicative of the power change event to a power management entity via the OOB communication channel;

receive updated power consumption allotment indicia from the power management entity via the OOB channel; and effectuate a change in a power consumption allotment of at least one component or device associated with the server blade in response to the updated power consumption allotment indicia, wherein the operations of monitoring power chance events, sending power state data, receiving undated power consumption allotment data, and effectuating a change in the power consumption allotment are performed in a manner that is transparent to an operating system running on the computing platform.

23. The blade server system of claim 22, further comprising a management card coupled to the interface plane, said management card comprising the power management entity.

24. A blade server system of claim 22, wherein the power management entity is embodied on at least one of the plurality of server blades.

25. The blade server system of claim 24, wherein the power management entity enforces a power management policy via execution of firmware on said at least one of the plurality of server blades, said power management policy defined to be implemented across one of a group of server blades, an individual blade server chassis, a plurality of blade server chassis, a blade server rack, or a plurality of blade server racks.

26. The blade server system of claim 24, wherein the power management policy is implemented as a peer-based policy under which power consumption allotments are negotiated among multiple server blades based on input from the multiple server blades.

* * * * *